United States Patent [19]

Flach

[11] Patent Number: 5,305,465

[45] Date of Patent: Apr. 19, 1994

[54] INTERFACE CHIP FOR COUPLING MODULATED SIGNALS

[75] Inventor: Werner Flach, Amberg, Fed. Rep. of Germany

[73] Assignee: Siemens Aktiengesellschaft, Munich, Fed. Rep. of Germany

[21] Appl. No.: 582,750

[22] Filed: Sep. 14, 1990

[30] Foreign Application Priority Data

Sep. 28, 1989 [EP] European Pat. Off. ........ 89117970.7

[51] Int. Cl.⁵ .............................................. H04H 1/00
[52] U.S. Cl. .................................... 455/6.1; 455/6.3; 455/73; 375/36
[58] Field of Search ............... 455/6.1, 6.3, 41, 73-74, 455/14, 15, 23; 375/36, 7

[56] References Cited

U.S. PATENT DOCUMENTS

| | | | |
|---|---|---|---|
| 4,429,384 | 1/1984 | Kaplinsky | 375/36 |
| 4,797,904 | 1/1989 | Dekker et al. | 375/36 |
| 4,881,244 | 11/1989 | Haug | 375/36 |
| 5,140,172 | 8/1992 | Flach | 375/36 |

FOREIGN PATENT DOCUMENTS

| | | | |
|---|---|---|---|
| 0410873 | 1/1991 | European Pat. Off. | 375/36 |
| 0419708 | 4/1991 | European Pat. Off. | 375/36 |
| 0419711 | 4/1991 | European Pat. Off. | 375/36 |
| 0419712 | 4/1991 | European Pat. Off. | 375/36 |
| 2185666 | 7/1987 | United Kingdom . | |

OTHER PUBLICATIONS

New Electronics, vol. 20, No. 18, Sep. 15, 1987; London, GB, pp. 21-23; A. Dench: "Components & Design Techniques for MIL-STD-1553B Implementation".
Elektronik, vol. 33, No. 12, Jun. 15, 1984, München, DE, pp. 97-98; H. Abendroth: "Bus-Fähige Schnittstelle Nach RS 485/422".
Elektronik, vol. 35, No. 19, Sep. 19, 1986, München, DE, pp. 146-148, 153-154; R. Wilson: "Hochleistungsnetze für Peripheriegeräte Aufbau von SCSI-und IPI--Schnittstellen mit RS-485 transceivern".

Primary Examiner—Reinhard J. Eisenzopf
Assistant Examiner—Andrew Faile
Attorney, Agent, or Firm—Kenyon & Kenyon

[57] ABSTRACT

An interface module may have a customized circuit to enable an operation using modulated signals, which are free of direct current, by way of a serial bus interface. To effect the communication, adapted connecting means are also needed to connect a subscriber to a two-wire line bus. An interface chip achieves a user friendly connection. Starting from its terminal side going toward the two-wire line bus the interface chip features a transformer and, with it, in series a parallel connection consisting of a receiver and a transmitter. Furthermore, in the interface chip, a comparator and a voltage source are provided, which transmit, as a function of the level of the modulated signals, a blocking signal to a circuit used to modulate and demodulate the signals. To release the signals to be transmitted, the customized circuit transmits an enabling signal to the transmitter. This design of the interface chip has the additional advantage of featuring electrical isolation between the subscriber and the two-wire line bus.

17 Claims, 1 Drawing Sheet

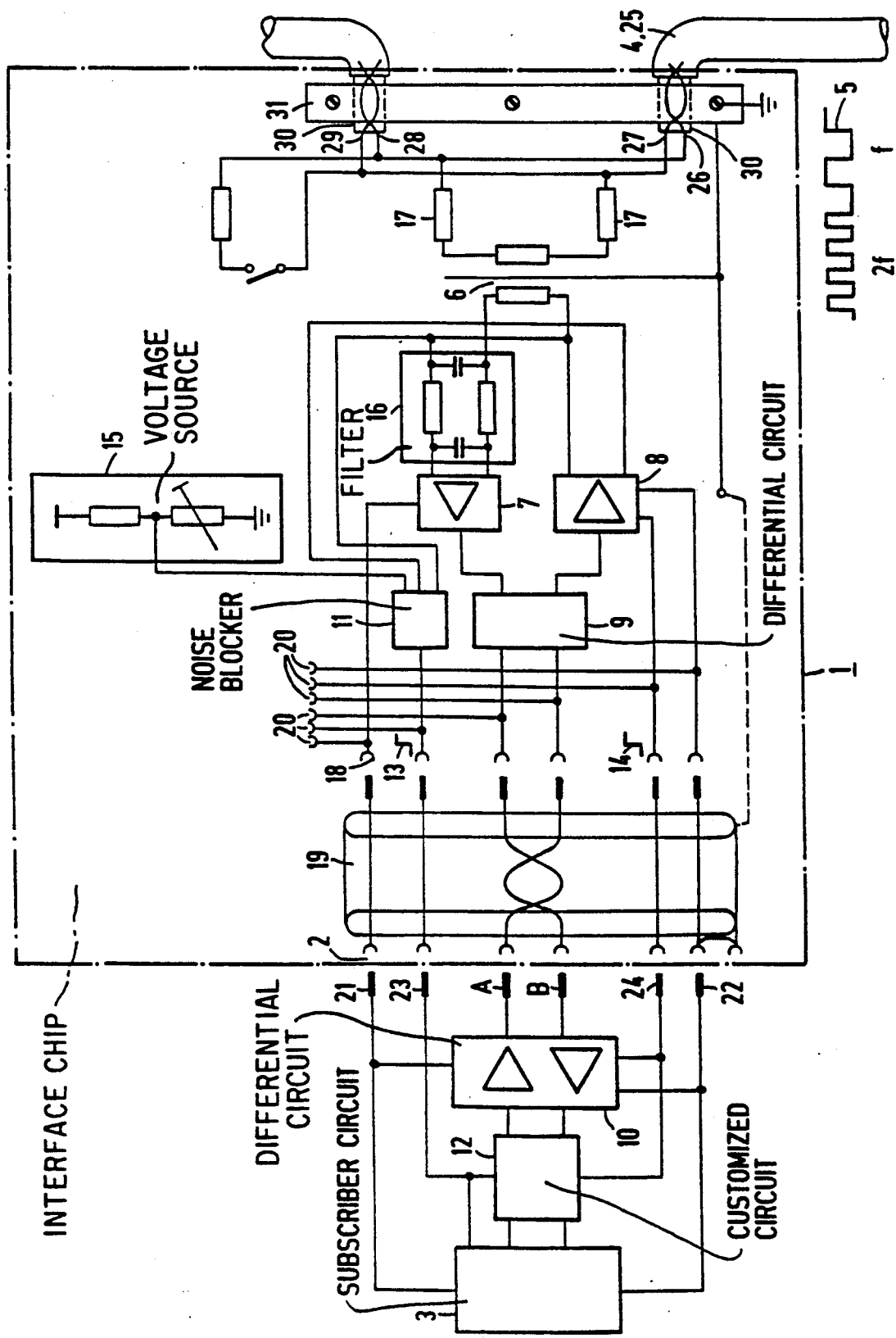

INTERFACE CHIP FOR COUPLING MODULATED SIGNALS

BACKGROUND OF THE INVENTION

The present invention relates to a communication system, and more particularly to a connector connecting a subscriber of the communication system to a bus.

Subscriber communication systems are well known. In such systems the subscriber circuitry may include a microprocessor and the bus may be a two wire line bus. In such a system the subscriber may be provided with a bus interface, which has two interface connections for transferring a differential signal (RS 485 Interface, IIA Standard RS 485, Elektronik, Vol. 35, No. 19, 9/19/86, pp. 146 to 154) and which is provided with a third interface connection to a voltage supply and with a fourth interface connection connected to ground.

Connectors for such systems are usually integrated into the circuitry of a subscriber. In subassemblies of the subscriber circuitry, for example, the connectors are integrated in the artwork pattern.

Copending U.S. patent application Ser. No. 07/501,166 filed 29 Mar. 1990 abandoned, proposes an interface module with a customized circuit, which enables an operation with modulated signals, which are free of direct current, by way of a serial bus interface. This advantageously provides communication between remote subscribers across buses with a considerable line length. If this type of customized chip is provided in front of the bus interface on the side of the subscriber, then an adapted connector is still needed to connect the chip to the two-wire line bus. It is complicated and possibly inappropriate to include these types of connecting means in the circuitry of a subscriber when, for example, only a small amount of space is available.

SUMMARY OF THE INVENTION

The present invention overcomes the shortcomings described above by creating a user-friendly connecting means for electric coupling between the above described bus interface and the two-wire line bus in operations using modulated signals free of direct current.

This task is solved by providing a subscriber circuit, including a customized circuit that transmits enabling signals, with a connection to an interface chip that transmits and receives signals of a first type and that includes a transformer adapted to be coupled to a two-wire line bus; a transceiver coupled in series with the transformer, the transceiver including a parallel connection of a transmitter, the transceiver including a parallel connection of a transmitter and a receiver and a differential amplifier coupled in series with the transceiver. The interface chip further includes a means, responsive to a level of the signals of the first type, for transmitting a blocking signal to the customized circuit of the subscriber circuit. Also, the transmitter of the interface chip is responsive to the enabling signal to release signals of the first type to the two-wire line bus.

This chip also advantageously features electrical isolation between the subscriber and the two-wire line bus.

If the signals of the first type are frequency-modulated or phase-modulated signals, then long line lengths (for example 7 km) are able to be achieved with low data-transmission speeds (for example 10 kBd).

It proves to be advantageous and simple when the means for providing the blocking signal is a noise blocker realized by a comparator and a voltage source.

One is able to rule out any corruption of the information to be transmitted due to interference signals, for example, when an interference signal suppressor is provided at the input of the receiver.

If ohmic resistors are provided at the connections of the winding of the transformer on the side of the two-wire line bus, a continued operation of the two-wire line bus is still possible even if this winding should short-circuit, since the resistors have the same effect as low-resistance subscribers. This means there is no interaction in case of a short-circuit, and this is to be viewed as particularly positive in various application fields, such as industrial processing engineering.

If a shielded cable is used for the connection to the bus interface, and this shielded cable can be connected via a line unit in the interface chip to the circuitry composed of the above components, then it is hereby possible for the customer to adapt the cable to the locally required line lengths by cutting appropriate lengths and providing proper terminations. To connect an additional subscriber by way of the interface chip, it is advantageous when a second line unit is provided, which has the same operative connections as the first line unit.

BRIEF DESCRIPTION OF THE DRAWING

The figure illustrates an interface chip in accordance with an embodiment of the present invention.

DETAILED DESCRIPTION

FIG. 1 illustrates an interface chip 1, which serves as a connection between a bus interface 2 of a subscriber 3 of a communication system and a two-wire line bus 4. Six interface connections A, B, 21, 22, 23 and 24, are associated with the interface 2. Connectors A and B are wired up to a differential amplifier 10, through which the signal exchange with a subscriber 3, for example a microprocessor, takes place. A customized circuit 12, which is used to modulate and demodulate signals transmitted on the two-wire line bus 4, is connected between the subscriber 3 and the differential amplifier 10. The interface connection 21 is used to supply voltage to the interface chip 1, while a grounded connection can be produced via the interface connection 22. The two other interface connections 23, 24 serve, on the one hand, to transmit a blocking signal 13, which indicates a quiescent state to be suppressed on the two-wire line bus 4 and, on the other hand, to transmit an enabling signal 14, which introduces the transmission of the signals from the subscriber 3, respectively.

The two-wire line bus 4 is realized by a shielded, double-core cable 25, which is separated to enable connection to the interface chip 1. The four cores of the cable are clamped to four terminals 26, 27, 28, 29 of the interface chip 1. To suppress interference, the two shields 30 of the cable 25 are connected to a ground terminal 31. The terminals 26, 28 on the one hand and 27, 29 on the other hand are electrically connected with one another, whereby a first winding of a transformer 6 is situated between both interconnection points across ohmic resistors 17, and a second winding is connected to a transmitter 8, a receiver 7 and a comparator 11. To suppress interference signals, a multi-stage filter 16 is connected between the second winding of transformer 6 and the input of the receiver 7. In addition, a differential amplifier 9 is connected to the output of receiver 7 and the input of transmitter 8 on a first side of the differential amplifier 9. On a second side of the differential amplifier, two lines are used for the actual signal transmission to two line units 18, 20. An additional shielded cable 19 couples the terminals of the line unit 18 and of the bus interface 2.

The customized circuit 12 converts the information supplied by the microprocessor 3, for example in the form of a transistor-transistor logic (TTL) signal, into frequency-modulated signals 5. The frequency-modulated signal 5 can be, for example, a signal composed of a series of first and second signal portions where the first signal portion has a fundamental frequency f and a second signal portion a double fundamental frequency 2f. However, it must be free of direct current so that the transformer 6 does not become saturated. Here, for example, the fundamental frequency f can be established for the signal state 1 as well as the for the quiescent state, and the double fundamental frequency 2f for the signal state 0. The signals 5 to be transmitted by the transformer 6 can have a voltage level on the order of magnitude of 100 mV.

Between the customized circuit 12 and the transmitter 8, however, a conversion into a differential signal is initially made by means of differential amplifiers 9, 10. This differential signal is retransformed into a modulated signal 5 and, as such, is fed to the transmitter 8.

After an enabling signal 14 has been transmitted by the customized circuit 12 via the interface connection 24 to the transmitter 8, the modulated signals 5 are transmitted by the transmitter 8 via the transformer 6 to the two-wire line bus 4.

Modulated signals 5 may be received by the interface chip from the two-wire line bus 4. After being transmitted by the transformer 6, the received modulated signals pass a multi-stage filter 16 to suppress interference signals, before reaching the receiver 7 and then after undergoing intermediate conversion by means of the two differential amplifiers 9, 10 into a differential signal, again arrive, as a modulated signal, at the customized circuit 12. Here, the modulated signals 5 are demodulated for further processing at the subscriber 3.

A comparator which compares the modulated signals 5, received on the side of the transformer 6 coupled to the differential amplifier 9, to an adjustable voltage of a voltage source 15, can be used to classify signals which are background noise so that they can be removed from an evaluation. To this end, when the received signal does not exceed adjusted voltage level, the comparator 11 transmits a blocking signal 13, via the interface connection 23, to the customized circuit 12.

Because the bus interface 2 features standardized interface connections, a coupling element to be used many times is made available by means of the previously described interface chip 1. This coupling element has a user-friendly operation, offers electrical isolation and, in addition, renders possible a communication over long line lengths at high data-transmission speeds. Moreover, the non-interaction of the chip with the bus in the case of short-circuits, exhibited by the interface chip of the present invention proves to be particularly advantageous.

I claim:

1. An interface circuit for connecting a bus interface of a subscriber circuit to a two-wire line bus on which modulated signals are transmitted, said subscriber circuit further comprising a first differential amplifier and a customized circuit, the interface circuit comprising:
   a transformer coupled to the two-wire line bus;
   a transceiver coupled to said transform, said transceiver comprising a parallel connection including a receiver and a transmitter, said transmitter releasing the modulated signals to be transmitted to the bus in response to an enabling signal received from the first differential amplifier;
   a second different amplifier coupled to said transceiver, said first and second differential amplifiers providing the modulated signals to said transmitter; and
   a noise blocker transmitting, as a function of the level of the modulated signals, a blocking signal to the customized circuit of the subscriber circuit.

2. The interface circuit according to claim 21, wherein said interface circuit comprises an interface chip.

3. The interface chip according to claim 2, wherein the modulated signals are frequency-modulated signals.

4. The interface chip according to claim 2, wherein the modulated signals are phase modulated signals.

5. The interface chip according to claim 2, wherein said noise blocker comprises a comparator and a voltage source.

6. The interface chip according to claim 2, further comprising an interference signal suppressor provided at an input of the receiver.

7. The interface chip according to claim 2, further comprising ohmic resistors provided at the connections of a winding of said transformer on the side of the two-wire line bus.

8. The interface circuit according to claim 1, wherein the modulated signals are frequency-modulated signals.

9. The interface circuit according to claim 1, wherein the modulated signals are phase modulated signals.

10. The interface circuit according to claim 1, wherein blocker comprises a comparator and a voltage source.

11. The interface circuit according to claim 8, wherein said noise blocker comprises a comparator and a voltage source.

12. The interface circuit according to claim 9, wherein said noise blocker comprises a comparator and a voltage source.

13. The interface circuit according to claim 1, further comprising an interference signal suppressor provided at an input of the receiver.

14. The interface circuit according to claim 10, further comprising an interference signal suppressor provided at an input of the receiver.

15. The interface circuit according to claim 1, further comprising ohmic resistors provided at the connections of a winding of said transformer on the side of the two-wire line bus.

16. The interface circuit according to claim 10, further comprising ohmic resistors provided at the connections of a winding of said transformer on the side of the two-wire line bus.

17. The interface circuit according to claim 13, further comprising ohmic resistors provided at the connections of a winding of said transformer on the side of the two-wire line bus.

* * * * *